(12) United States Patent
Kuwabara et al.

(10) Patent No.: US 8,451,321 B2
(45) Date of Patent: May 28, 2013

(54) IMAGE PROCESSING APPARATUS, IMAGE PROCESSING METHOD, AND PROGRAM

(75) Inventors: Takashi Kuwabara, Tokyo (JP); Kazuya Yokoyama, Chiba (JP)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 12/759,111

(22) Filed: Apr. 13, 2010

(65) Prior Publication Data

US 2010/0321472 A1    Dec. 23, 2010

(30) Foreign Application Priority Data

Jun. 19, 2009  (JP) ................................. 2009-145987

(51) Int. Cl.
  *H04N 13/00*    (2006.01)
(52) U.S. Cl.
  USPC .......................................................... 348/43
(58) Field of Classification Search
  USPC ....................................................... 348/40–60
  See application file for complete search history.

(56) References Cited

U.S. PATENT DOCUMENTS

| | | | |
|---|---|---|---|
| 8,208,008 B2 * | 6/2012 | Oota et al. ....................... | 348/42 |
| 2006/0106318 A1 | 5/2006 | Davidson | |
| 2006/0222238 A1 | 10/2006 | Nishiyama | |
| 2010/0194860 A1* | 8/2010 | Mentz et al. ..................... | 348/47 |
| 2012/0162367 A1* | 6/2012 | Ha ................................. | 348/43 |

FOREIGN PATENT DOCUMENTS

| | | |
|---|---|---|
| JP | 7-322302 A | 12/1995 |
| JP | 2003-319419 A | 11/2003 |
| JP | 2004-166885 A | 6/2004 |
| JP | 2004-357156 A | 12/2004 |
| JP | 3634677 | 1/2005 |
| JP | 2008-306602 A | 12/2008 |

OTHER PUBLICATIONS

Office Action issued Nov. 13, 2012 in Japanese Patent Application No. 2009-145987.

* cited by examiner

*Primary Examiner* — William C Vaughn, Jr.
*Assistant Examiner* — Naod Belai
(74) *Attorney, Agent, or Firm* — Oblon, Spivak, McClelland, Maier & Neustadt, L.L.P.

(57) ABSTRACT

An image processing apparatus includes a receiving unit receiving communication data including L and R images, an attribute information acquisition unit acquiring, from the communication data, attribute information including a photographing time, and an output control unit analyzing the images and the attribute information and switching between three-dimensional image display and two-dimensional image display. If L and R images photographed at the same photographing time have been acquired, the control unit performs three-dimensional image display. If not, the control unit determines whether or not an object imaging position error occurring in three-dimensional image display using L and R images photographed at different photographing times does not exceed a preset permissible object imaging position error, performs three-dimensional image display using the L and R images photographed at different photographing times if the error does not exceed the permissible error, and performs two-dimensional image display if the error exceeds the permissible error.

7 Claims, 12 Drawing Sheets

FIG. 9

| | CALCULATIONS OF PARAMETERS | |
|---|---|---|
| (1) | DISTANCE BETWEEN EYES AND OBJECT (IMAGING POSITION) [Do] | VALUE CALCULATED FROM Ws, Ds, AND We |
| (2) | PERMISSIBLE IMAGING POSITION ERROR [δDo] | SET VALUE |
| (3) | DISTANCE BETWEEN EYES AND DISPLAY SURFACE [Ds] | SET VALUE |
| (4) | DISTANCE BETWEEN EYES [We] | SET VALUE |
| (5) | BINOCULAR DISPARITY (DIFFERENCE BETWEEN OBJECT DISPLAY POSITIONS OF L AND R IMAGES ON DISPLAY SURFACE) [Ws] | VALUE CALCULATED BY IMAGE PROCESSING |
| (6) | INTER-FRAME MOTION VECTOR (MAXIMUM VALUE) [V] | VALUE CALCULATED BY IMAGE PROCESSING |
| (7) | PERMISSIBLE BINOCULAR DISPARITY SHIFT AMOUNT [δWs] | VALUE CALCULATED FROM Ds, Do, δDo, AND We OR SET VALUE |
| (8) | PERMISSIBLE L AND R IMAGE DISPLAY TIMING DIFFERENCE AMOUNT (PERMISSIBLE PHOTOGRAPHING TIME DIFFERENCE) [δT] | VALUE CALCULATED FROM δWs AND V OR SET VALUE |

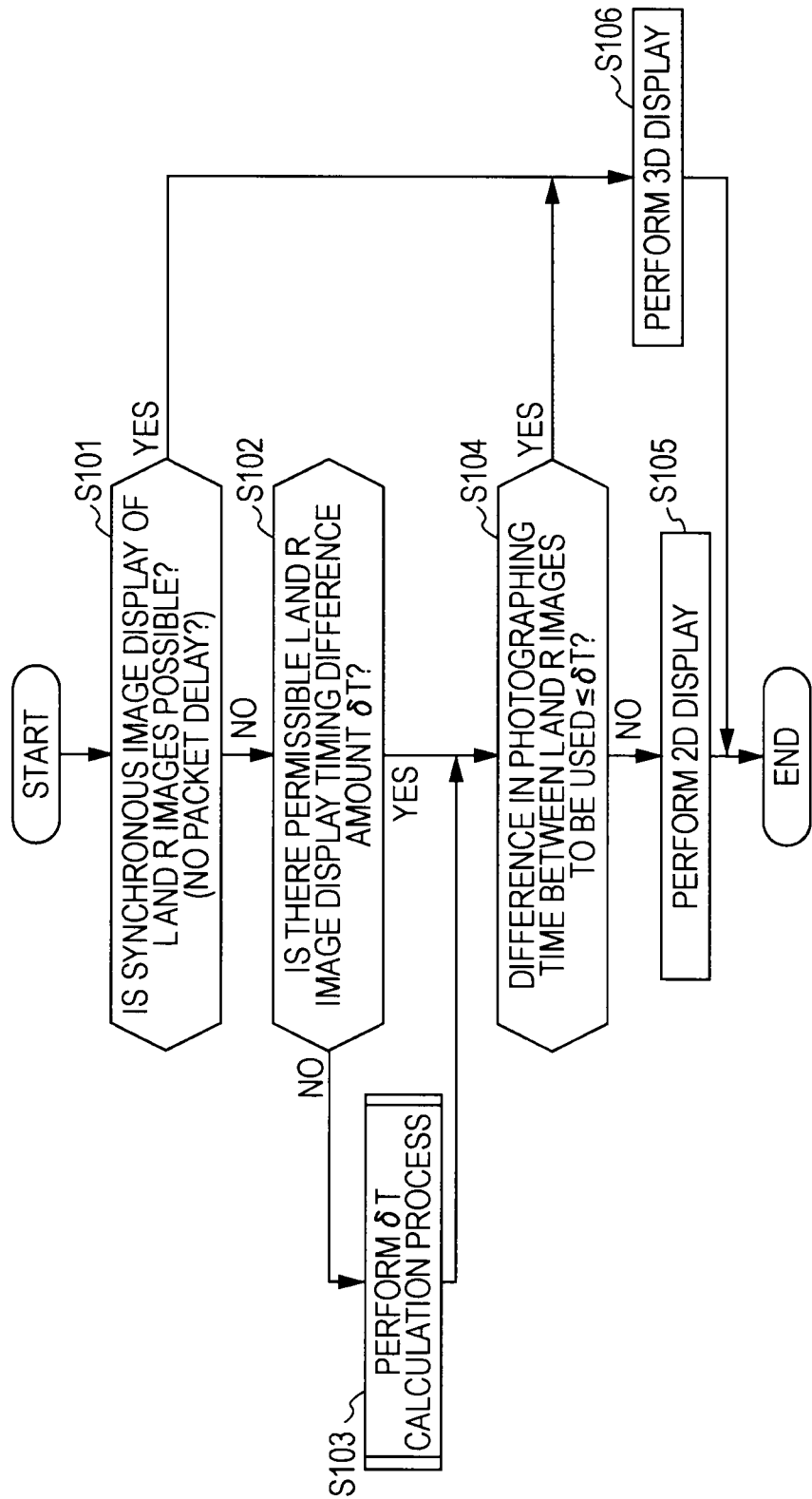

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More in detail, the present invention relates to an image processing apparatus, an image processing method, and a program which receive, through a network, images photographed by a plurality of cameras for photographing images to be applied to three-dimensional (3D: 3-Dimensional) image display and display the received images on a display unit.

2. Description of the Related Art

In recent years, systems for displaying a three-dimensional image, i.e., a 3D (3-Dimensional) image have been actively developed and used. Representative systems for displaying the 3D image include the passive stereo system and the active stereo system.

The passive stereo system allows the passage of only light vibrating in a particular direction by using a polarizing filter, for example, to separately produce the image for the left eye and the image for the right eye to be observed by the left eye and the right eye of an observer, respectively. Before the output light forming an image displayed by an image display device reaches the eyes of the observer, the light is separated into the light for the left eye and the light for the right eye through the polarizing filter. For example, through polarizing glasses worn by the observer, the image light for the left eye is input only to the left eye without being input to the right eye, and the image light for the right eye is input only to the right eye without being input to the left eye. In this manner, the system inputs the image for the left eye and the image for the right eye to the left eye and the right eye of the observer, respectively, to thereby achieve stereoscopic vision.

Meanwhile, the active stereo system is called a time-division system, for example, and achieves the separation into the left image and the right image by using shutter glasses in synchronization with the frame switching timing of the image display device. According to the mechanism of the system, the image display device displays the image for the left eye and the image for the right eye by switching between the images in each frame, and the shutter glasses worn by the observer cover the right eye of the observer during the display of the image for the left eye and cover the left eye of the observer during the display of the image for the right eye.

To display the 3D image in accordance with the systems as described above, images photographed from a plurality of different viewpoints are used. For example, the images photographed by a camera L for photographing the image for the left eye and a camera R for photographing the image for the right eye are used.

For example, when the images photographed by the two cameras L and R are transferred through a network and received and displayed by an image processing apparatus, such as a PC (Personal Computer) and a TV (Television), located at a remote location, a process is performed which generates display data by reliably receiving the two images photographed at the same time by the cameras L and R. Systems of this type are described in the publications of Japanese Unexamined Patent Application Publication Nos. 2005-94073 and 2006-140618, and Japanese Unexamined Patent Application Publication (Translation of PCT Application) No. 11-504167, for example.

However, it is difficult to completely prevent the loss and delay of a data transfer packet in network communication. For example, there arises such a situation that the image photographed by the camera L at a time t1 has been received but the image photographed by the camera R at the same time t1 has not been received. In this case, the apparatus having received the data fails to display a correct 3D image.

For example, if the apparatus which receives and displays data has received the images photographed by the camera L at times t, t+1, and so forth, but has received only the images photographed by the camera R at times up to a time t−1, the image display is stopped with the images photographed at the time t−1.

Alternatively, a process may be performed which displays the correct images photographed by the camera L in accordance with the time transition of the times t, t+1, and so forth, while continuing to display the image photographed by the camera R at the time t−1. However, the process of displaying asynchronous images, such as the L image (image for the left eye) and R image (image for the right eye) as described above, impairs the correct stereoscopic effect of the 3D image.

SUMMARY OF THE INVENTION

The present invention has been made in view of the above-described issues, for example. It is desirable in the present invention to provide an image processing apparatus, an image processing method, and a program which, in a system wherein images from a plurality of viewpoints for forming a three-dimensional image, e.g., an image for the left eye and an image for the right eye, are transferred through a network and three-dimensional image display is performed by an apparatus that receives the images, display a three-dimensional (3D) image and a two-dimensional (2D) image by switching between the images in accordance with the acquisition status of the images from a plurality of viewpoints and the status of the images.

An image processing apparatus according to a first embodiment of the present invention includes a receiving unit configured to receive communication data including an L image (image for the left eye) and an R image (image for the right eye), which are applied to three-dimensional image display, an attribute information acquisition unit configured to acquire, from the communication data, attribute information including a photographing time, and an output control unit configured to analyze the images and the attribute information included in the communication data, and perform a process of switching between three-dimensional image display and two-dimensional image display on the basis of the result of the analysis. If a pair of L and R images photographed at the same photographing time has been acquired, the output control unit performs the three-dimensional image display. If a pair of L and R images photographed at the same photographing time has not been acquired, the output control unit determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error.

Further, in the image processing apparatus according to the embodiment of the present invention, the output control unit may calculate an inter-frame motion vector V of a moving object having a maximum moving speed among moving objects included in the L and R images photographed at different photographing times, calculate a permissible photographing time difference $\delta T$ by using the motion vector V and a permissible binocular disparity shift amount $\delta Ws$ on a display surface of a three-dimensional image, perform the three-dimensional image display using the L and R images photographed at different photographing times if the difference in photographing time between the L and R images photographed at different photographing times does not exceed the permissible photographing time difference $\delta T$, and stop the three-dimensional image display and perform the two-dimensional image display if the difference in photographing time between the L and R images photographed at different photographing times exceeds the permissible photographing time difference $\delta T$.

Further, in the image processing apparatus according to the embodiment of the present invention, the output control unit may acquire a moving speed Vs of the object from the motion vector V and perform a process of calculating the permissible photographing time difference $\delta T$ in accordance with an expression $\delta T=\delta Ws/Vs$.

Further, in the image processing apparatus according to the embodiment of the present invention, the output control unit may acquire a permissible binocular disparity shift amount $\delta Wsx$ in the x-direction and a permissible binocular disparity shift amount $\delta Wsy$ in the y-direction of the permissible binocular disparity shift amount $\delta Ws$ on the display surface of the three-dimensional image, acquire a moving speed Vsx in the x-direction and a moving speed Vsy in the y-direction predetermined by the inter-frame motion vector V, and perform a process of calculating the permissible photographing time difference $\delta T$ as the smaller one of values $\delta Wsx/Vsx$ and $\delta Wsy/Vsy$.

Further, in the image processing apparatus according to the embodiment of the present invention, the output control unit may acquire a preset permissible photographing time difference $\delta T$, perform the three-dimensional image display using the L and R images photographed at different photographing times if the difference in photographing time between the L and R images photographed at different photographing times does not exceed the permissible photographing time difference $\delta T$, and stop the three-dimensional image display and perform the two-dimensional image display if the difference in photographing time between the L and R images photographed at different photographing times exceeds the permissible photographing time difference $\delta T$.

Further, in the image processing apparatus according to the embodiment of the present invention, to stop the three-dimensional image display and perform the two-dimensional image display, the output control unit may perform the two-dimensional image display by referring to priority information included in the attribute information stored in the communication data and selecting an image having a high priority.

Further, an image processing method according to a second embodiment of the present invention is performed by an image processing apparatus, and includes the steps of: causing a communication unit to receive communication data including an L image (image for the left eye) and an R image (image for the right eye), which are applied to three-dimensional image display; causing an attribute information acquisition unit to acquire, from the communication data, attribute information including a photographing time; and causing an output control unit to analyze the images and the attribute information included in the communication data, and perform a process of switching between three-dimensional image display and two-dimensional image display on the basis of the result of the analysis. If a pair of L and R images photographed at the same photographing time has been acquired, the analyzing and switching step performs the three-dimensional image display. If a pair of L and R images photographed at the same photographing time has not been acquired, the analyzing and switching step determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error.

Further, a program according to a third embodiment of the present invention causes an image processing apparatus to perform image processing, and includes the steps of: causing a communication unit to receive communication data including an L image (image for the left eye) and an R image (image for the right eye), which are applied to three-dimensional image display; causing an attribute information acquisition unit to acquire, from the communication data, attribute information including a photographing time; and causing an output control unit to analyze the images and the attribute information included in the communication data, and perform a process of switching between three-dimensional image display and two-dimensional image display on the basis of the result of the analysis. If a pair of L and R images photographed at the same photographing time has been acquired, the analyzing and switching step performs the three-dimensional image display. If a pair of L and R images photographed at the same photographing time has not been acquired, the analyzing and switching step determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error.

The program according to the embodiment of the present invention can be provided to, for example, an image processing apparatus or a computer system capable of executing a variety of program codes by a storage or communication medium which provides a program in a computer-readable format. With such a program provided in a computer-readable format, processing according to the program is realized by the image processing apparatus or the computer system.

Further issues to be addressed, characteristics, and advantages of the present invention will become apparent from more detailed description based on the embodiments of the present invention described later and the accompanying drawings. In the present specification, a system refers to a logical collective configuration of a plurality of apparatuses, and is not limited to apparatuses of respective configurations stored in the same housing.

According to the configuration of an embodiment of the present invention, in an image processing apparatus which receives communication data including an L image (image for the left eye) and an R image (image for the right eye) and performs three-dimensional (3D) image display on the basis of the received data, if a pair of L and R images photographed at the same photographing time has been acquired, the three-dimensional image display is performed. If a pair of L and R images photographed at the same photographing time has not been acquired, it is determined whether or not an object imaging position error occurring in the three-dimensional image display using L and R images photographed at different photographing times does not exceed a preset permissible object imaging position error. Then, if the object imaging position error does not exceed the permissible error, the three-dimensional image display using the L and R images photographed at different photographing times is performed. If the object imaging position error exceeds the permissible error, the three-dimensional image display is stopped, and the two-dimensional image display is performed. Due to the present configuration, it is possible to provide an image not causing an unnatural sense of depth even in the three-dimensional image display using a pair of L and R images photographed at different photographing times.

BRIEF DESCRIPTION OF THE DRAWINGS

FIG. 9 is a diagram for explaining parameters used to determine which one of 3D image display and 2D image display should be performed in the image processing apparatus according to an embodiment of the present invention;

FIG. 10 is a diagram illustrating a flowchart for explaining a process sequence for determining which one of 3D image display and 2D image display should be performed in the image processing apparatus according to an embodiment of the present invention;

DESCRIPTION OF THE PREFERRED EMBODIMENTS

Details of an image processing apparatus, an image processing method, and a program according to embodiments of the present invention will be described below with reference to the drawings. The description will be made of the following items: 1. Overview of Configuration and Processing of Image Processing Apparatus according to Embodiment of Present Invention, 2. 3D Image Display Examples and 3D Image Display Condition, and 3. Details of Processing Performed by Image Processing Apparatus according to Embodiment of Present Invention.

[1. Overview of Configuration and Processing of Image Processing Apparatus According to Embodiment of Present Invention]

Figure 1:
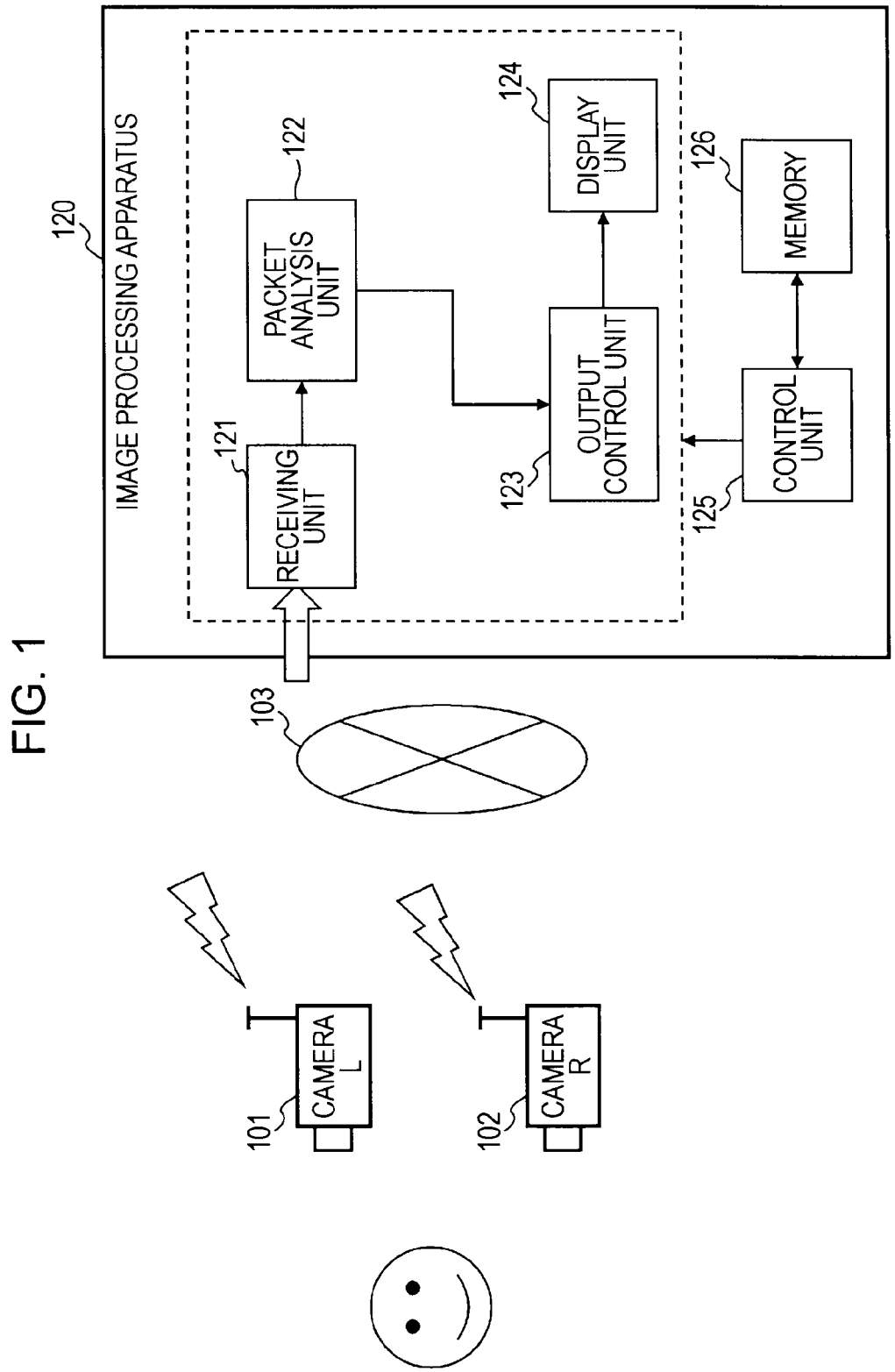
FIG. 1 is a diagram for explaining an overview of processing using an image processing apparatus according to an embodiment of the present invention, and a configuration example of the image processing apparatus.

With reference to FIG. 1 and the subsequent drawings, description will be first made of an overview of a configuration example and the processing of an image processing apparatus according to an embodiment of the present invention. FIG. 1 illustrates cameras L101 and R102 for photographing images from a plurality of viewpoints to form a three-dimensional image (3D image), a network 103, and an image processing apparatus 120.

The camera L101 photographs the image for the left eye for forming the three-dimensional image (3D image), and the camera R102 photographs the image for the right eye for forming the three-dimensional image (3D image). The photographed images are packetized together with attribute information of image data, and are transferred to the image processing apparatus 120 through the network 103. The image processing apparatus 120 receives packets transmitted from the cameras L101 and R102, and acquires and displays the image data on a display unit 124.

The image processing apparatus 120 includes a receiving unit 121, a packet analysis unit 122, an output control unit 123, the display unit 124, a control unit 125, and a memory 126. The receiving unit 121 receives the packets transmitted from the cameras L101 and R102. The received packets are analyzed by the packet analysis unit 122, and the image data, the attribute information, and so forth are extracted from the packets. The attribute information includes, for example, photographing time information of respective photographed image frames.

The extracted data is transferred to the output control unit 123, and a 3D display image is displayed on the display unit 124 with the use of the images photographed by the cameras L101 and R102. The image processing apparatus 120 according to the embodiment of the present invention performs a process of switching between the display of the three-dimensional (3D) image and the display of the two-dimensional (2D) image on the basis of the reception status of the images photographed by the cameras L101 and R102 and the analysis of the image content. Details of this process will be described later.

The control unit 125 performs an overall control of the processes performed by the receiving unit 121, the packet analysis unit 122, the output control unit 123, and the display unit 124. For example, the control unit 125 performs the control in accordance with a program stored in the memory 126.

As previously described, the 3D image display systems include the passive stereo system and the active stereo system. The passive stereo system allows the passage of only light vibrating in a particular direction by using a polarizing filter, for example, to separately produce the image for the left eye and the image for the right eye to be observed by the left eye and the right eye of an observer, respectively.

The active stereo system is called a time-division system, for example, and achieves the separation into the left image and the right image by using shutter glasses in synchronization with the frame switching timing of an image display device.

The passive stereo system and the active stereo system are both applicable to the image processing apparatus 120 according to the embodiment of the present invention. The image processing apparatus 120 according to the embodiment of the present invention acquires a pair of images photographed at the same time from the packets transmitted from the cameras L101 and R102, and performs the 3D image display according to one of the above-described systems.

In the packet transfer through the network 103, however, packet loss or delay occurs with a predetermined probability. The image processing apparatus 120 according to the embodiment of the present invention performs a process for handling situations such as the packet loss and delay. Specifically, the output control unit 123 of the image processing apparatus 120 analyzes the acquisition status of the images photographed by the cameras L101 and R102 and the image content.

For example, if the reception of a pair of images photographed at the same time by the cameras L101 and R102 is confirmed, the 3D image display using the pair of images is performed. Further, if there arises a situation in which one of the paired images photographed at the same time by the cameras L101 and R102 has not been received, it is determined whether or not a natural 3D image can be displayed if images photographed at different photographing times by the cameras L101 and R102 are combined and displayed.

If a natural 3D image can be displayed, the 3D image display is performed with the use of the L and R images having the time difference. If it is determined difficult to display a natural 3D image, the 3D image display is stopped, and a 2D image is displayed with the use of one of the image photographed by the camera L101 and the image photographed by the camera R102.

Figure 2:
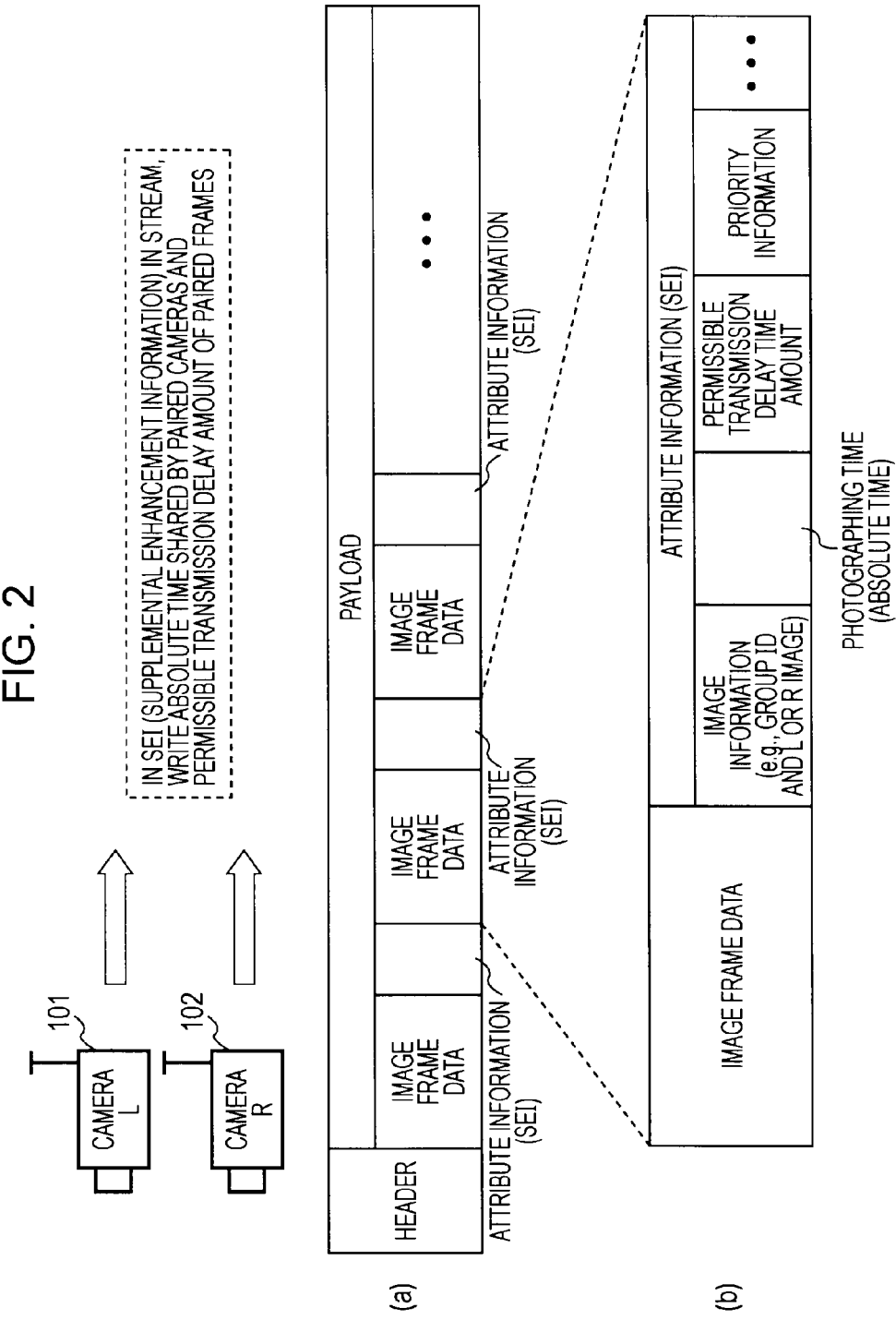
FIG. 2 is a diagram for explaining a configuration example of packets transferred from cameras to the image processing apparatus in an embodiment of the present invention.

FIG. 2 illustrates a configuration example of the packets used in the transfer of the images photographed by the cameras L101 and R102. In FIG. 2, (a) illustrates a configuration example of the packets output from the cameras L101 and R102. The cameras L101 and R102 set the packets having a similar configuration, and output the packets to the network 103 by designating the image processing apparatus 120 as the destination.

As illustrated in (a) of FIG. 2, a packet has a configuration in which a header containing address information and so forth is followed by a payload set as actual data to be transferred. The payload contains a plurality of photographed image frame data items and attribute information (SEI: Supplemental Enhancement Information) items corresponding to the respective image frames. The image frame data is stored as MPEG (Moving Picture Experts Group)-encoded data, for example.

As illustrated in (b) of FIG. 2, the attribute information (SEI) includes: image information including a group ID (Identifier) serving as the identifier of a camera group, image type (L or R) information indicating which one of the image photographed by the camera L101 and the image photographed by the camera R102 is the corresponding image, and so forth; photographing time information; a permissible transmission delay time amount; priority information; and so forth.

The photographing time information refers to time information common to the cameras L101 and R102. For example, time information such as the standard time acquired through the Internet is used by the respective cameras and set as the photographing times of the respective photographed image frames.

The permissible transmission delay time amount refers to, for example, the information of a time previously set or set by a user and representing the permissible delay time of the image photographed by one of the two cameras with respect to the image photographed at the same time by the other camera.

The priority information refers to the information recording which one of the L and R images photographed by the two cameras should be preferentially used when the image processing apparatus 120 stops the 3D image display and performs the two-dimensional (2D) image display.

The attribute information including the above information items is set in association with each of the photographed image frames. Each packet stores a plurality of image frames and attribute information items.

FIG. 2 illustrates SEI as an attribute information storing region. However, the region for storing the attribute information is not limited to the SEI field as illustrated in FIG. 2, and can be set in a variety of ways. For example, the configuration may be modified such that fields capable of storing arbitrary data, e.g., a user data field, are set in a packet to store the attribute information in these fields. The configuration may also be modified to use attribute information storing packets separate from image data storing packets.

Subsequently, with reference to FIG. 3, details of the internal configuration of the image processing apparatus 120 and the processing thereof will be described. The data packets containing photographed data transmitted from the cameras L101 and R102 are received by the receiving unit 121 of the image processing apparatus 120 and input to the packet analysis unit 122.

Figure 3:
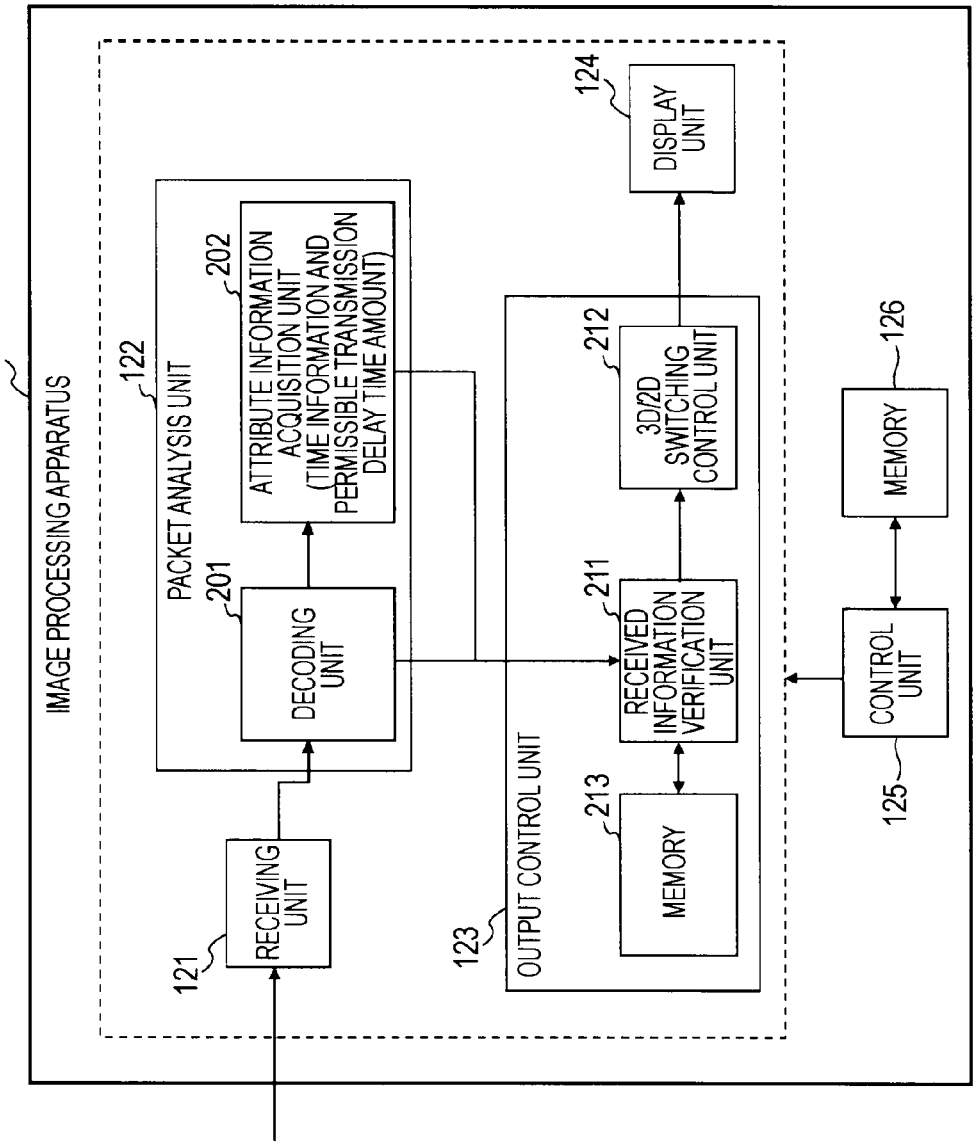
FIG. 3 is a diagram for explaining a configuration example of the image processing apparatus according to an embodiment of the present invention.

As illustrated in FIG. 3, the packet analysis unit 122 includes a decoding unit 201 and an attribute information acquisition unit 202. The decoding unit 201 performs a process of decoding, for example, the MPEG-encoded image data, and outputs the decoding result to a received information verification unit 211 of the output control unit 123. The attribute information acquisition unit 202 acquires the image type (L or R image) information, the photographing time information, and the permissible transmission delay time amount stored in the packets as the attribute information corresponding to the image frames previously described with reference to FIG. 2, and outputs these information items to the received information verification unit 211 of the output control unit 123.

The received information verification unit 211 of the output control unit 123 determines whether to output a 3D image or a 2D image by performing data processing using the image information input from the decoding unit 201, the attribute information input from the attribute information acquisition unit 202, and the parameters stored in a memory 213.

In accordance with the determination made by the received information verification unit 211, a 3D/2D switching control unit 212 displays the 3D image or the 2D image on the display unit 124.

That is, as described above, if a pair of images photographed at the same time by the cameras L101 and R102 has been received, the 3D image is displayed. If one of the paired images has not been received, and if it is determined that a natural 3D image can be displayed by the combination of images photographed at different photographing times, the 3D image is displayed with the use of the L and R images having the difference in photographing time. If it is determined difficult to display a natural 3D image by combining images photographed at different photographing times, the 3D image display is stopped, and the 2D image is displayed with the use of one of the image photographed by the camera L101 and the image photographed by the camera R102. For example, the 2D image display is performed with the image selected in accordance with the priority information included in the attribute information previously described with reference to FIG. 2.

[2. 3D Image Display Examples and 3D Image Display Condition]

Subsequently, 3D image display examples and a 3D image display condition will be described.

Figure 4:
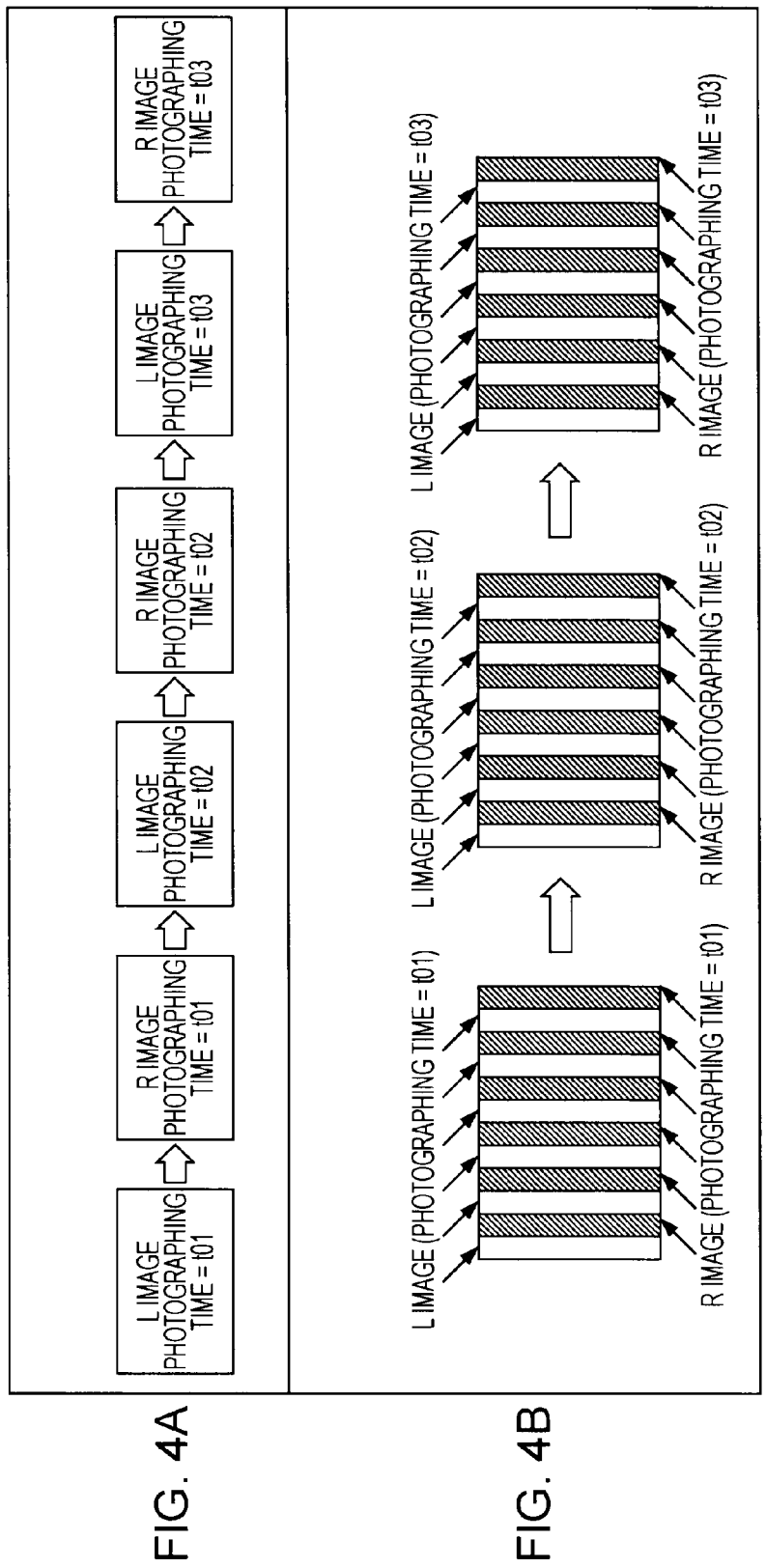
FIGS. 4A and 4B are diagrams for explaining examples of a three-dimensional (3D) image display process.

With reference to FIGS. 4A and 4B, examples of the 3D image displayed on the display unit 124 will be first described. FIGS. 4A and 4B illustrate 3D image display examples according to the following systems: (1) the active stereo system and (2) the passive stereo system.

As illustrated in FIG. 4A, according to (1) the active stereo system, the L image as the image photographed by the camera L101 and the R image as the image photographed by the camera R102 are alternately displayed in time series, and an observer wearing liquid crystal shutter glasses corresponding to the left and right eyes of the observer observes the L image and the R image with the left eye and the right eye, respectively.

As illustrated in FIG. 4B, according to (2) the passive stereo system, one frame image output to a display unit is formed by the alternately arranged L and R images. The L and R images are polarized images. Through polarizing glasses worn by an observer, L image portions and R image portions are observed by the left eye and the right eye of the observer, respectively.

According to (1) the active stereo system, the L and R images photographed at the same time are alternately output. Meanwhile, according to (2) the passive stereo system, one frame image is generated and output with the use of the L and R images photographed at the same time.

In the examples illustrated in FIGS. 4A and 4B, the L and R images photographed at photographing times t01 to t03 have all been acquired. With the use of these acquired images, a correct 3D image can be displayed and observed both by the systems (1) and (2).

However, if the packet storing one of the L and R images is lost or delayed, the display process using the pair of L and R images photographed at the same photographing time at each of t01 to t03 as illustrated in FIGS. 4A and 4B is prevented in some cases.

Figure 5:
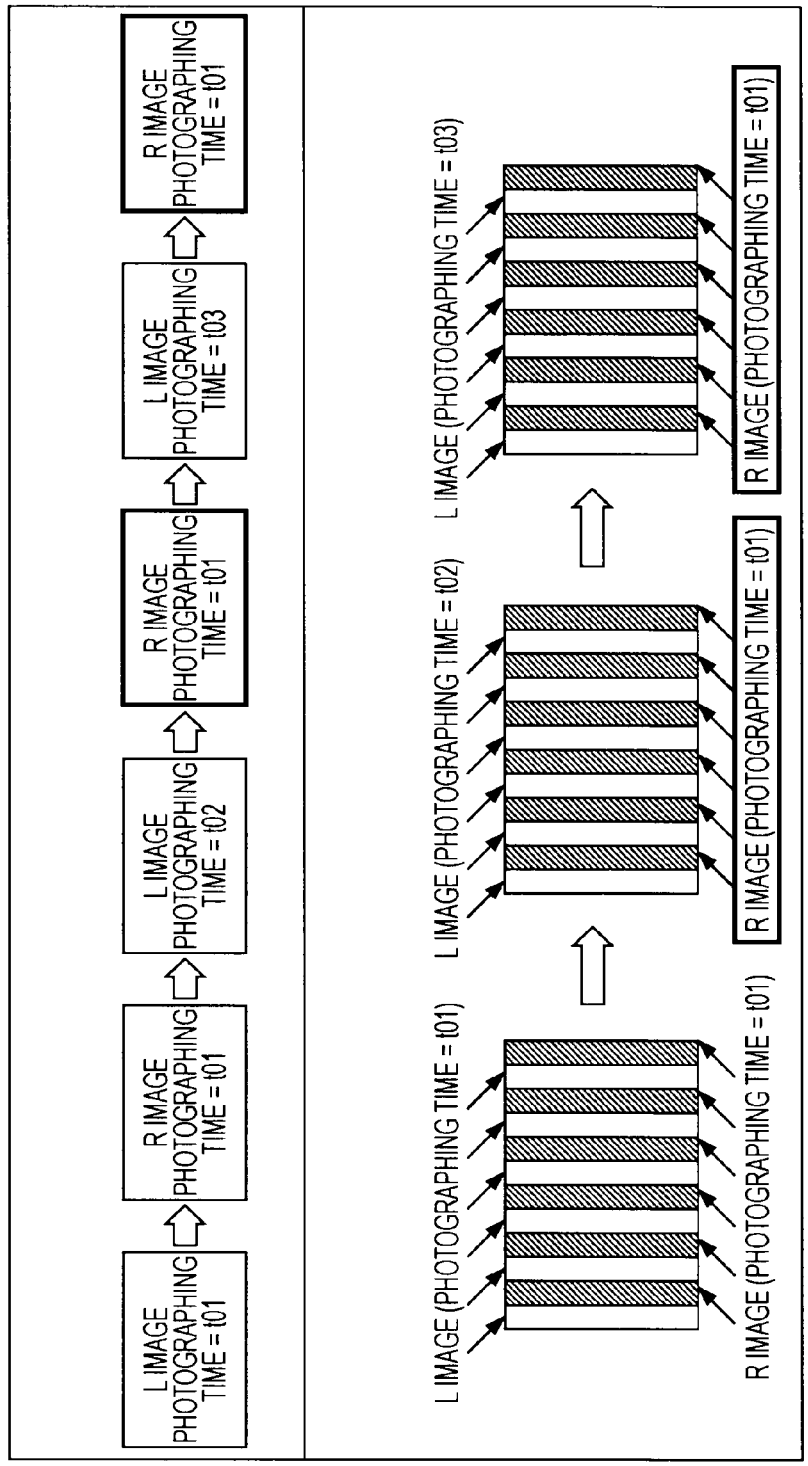
FIGS. 5A and 5B are diagrams for explaining examples of a three-dimensional (3D) image display process performed when L and R images in synchronization with each other in photographing time are not acquired.

A specific example will be described with reference to FIGS. 5A and 5B. FIGS. 5A and 5B illustrate examples of the process performed when the L images photographed at the photographing times t01 to t03 have been acquired, whereas the R images photographed at the times t02 and t03 have not been acquired and only the R image photographed at the time t01 has been acquired.

In this case, both the systems (1) and (2) can successfully perform the 3D image display up to the 3D image display using the pair of L and R images photographed at the photographing time t01, for example. However, the R images photographed at the time t02 and thereafter have not been acquired, and thus normal 3D image display is prevented.

Examples of the process performed in this case include, for example, (a) displaying the images photographed at the photographing times up to t01, and thereafter stopping the display and standing by until the pair of L and R images photographed at the photographing time t02 is acquired, and (b) displaying the images photographed at the photographing times up to t01, and thereafter using the L images photographed at the photographing times t02 and t03 while continuing to use the R image photographed at the photographing time t01. The latter example is illustrated in FIGS. 5A and 5B.

If the above process of (a) is performed, the display image is discontinued. Meanwhile, if the process of (b) is performed, the correct 3D image is not displayed, and an unnatural image lacking the correct depth effect is output in some cases.

In the output control unit 123 of the image processing apparatus 120 according to the embodiment of the present invention, the received information verification unit 211 analyzes the received information (images and attribute information), and determines whether or not a natural 3D image can be displayed if the images photographed at different photographing times by the cameras L101 and R102 are combined and displayed. If a natural 3D image can be displayed, the 3D image is displayed with the use of the L and R images having the difference in photographing time. If it is determined difficult to display a natural 3D image, the display of the 3D image is stopped, and a 2D image is displayed with the use of one of the image photographed by the camera L101 and the image photographed by the camera R102.

In the above-described manner, the output control unit 123 of the image processing apparatus 120 according to the embodiment of the present invention performs the process of determining whether or not a natural 3D image can be displayed if the images photographed at different photographing times by the cameras L101 and R102 are combined and displayed. Prior to the description of this specific process, description will be first made of the principle of obtaining the depth effect in the 3D image display, with reference to FIG. 6.

Figure 6:
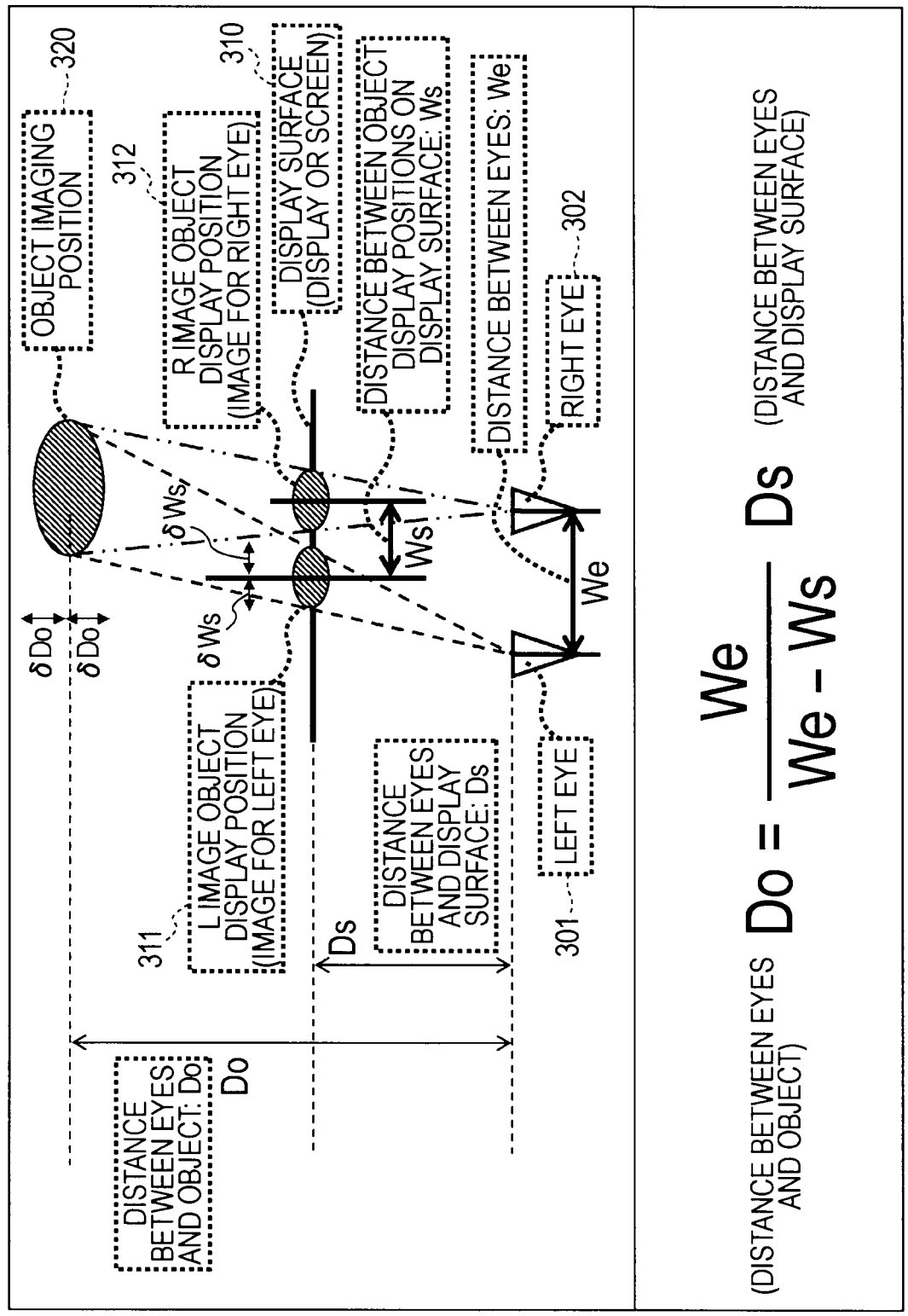
FIG. 6 is a diagram for explaining how an object is viewed in three-dimensional (3D) image display.

FIG. 6 illustrates a left eye 301 and a right eye 302 of an observer, a display surface 310, and an object imaging position 320. The display surface 310 is a display surface displaying the 3D image previously described with reference to FIGS. 4A to 5B, such as a TV, a display, or a screen, for example. The object imaging position 320 represents the position of an object sensed by the observer.

The display surface 310 displays the same object in each of the L image and the R image, thereby displaying the object at different display positions for the respective images, i.e., an L image object display position 311 and an R image object display position 312 illustrated in the drawing. The object at the L image object display position 311 is observed only by the left eye 301 of the observer, and the object at the R image object display position 312 is observed only by the right eye 302 of the observer. As a result, the object position sensed by the observer corresponds to the object imaging position 320 illustrated in the drawing.

That is, the observer senses that the object position is away from the eyes of the observer by a distance Do. When the distance between the eyes and the object is represented as Do and the distance between the eyes and the display surface is represented as Ds, the relationship between Do and Ds can be represented by the following expression (Mathematical Expression 1).

$$Do = (We/(We - Ws))Ds \qquad \text{(Mathematical Expression 1)}$$

Herein, We represents the distance between the left and right eyes of the observer, and Ws represents the distance between the respective display positions of the same object in the L and R images on the display surface.

For example, if the L and R images photographed at the same time have been acquired, the display surface 310 illustrated in FIG. 6 displays the object at the L image object display position 311 and the R image object display position 312. As a result, the observer can sense that the object is located at the object imaging position 320.

When the object is not a moving object, even if images photographed at different photographing times, e.g., the L image photographed at the photographing time t01 and the R image photographed at the photographing time t02, are used instead of using the L and R images photographed at the same time, the respective display positions on the display surface 310 illustrated in FIG. 6, i.e., the L image object display position 311 and the R image object display position 312 do not move. In this case, therefore, even if the 3D display is performed by the combination of the L image photographed at the photographing time t01 and the R image photographed at the photographing time t02, natural 3D image display can be performed.

If the object is a moving object, however, there arises an issue. When the object is a moving object, if the L and R images photographed at different photographing times are combined, the distance Ws between the L image object display position 311 and the R image object display position 312 changes. As a result, the object imaging position 320 shifts forward or backward, and the correct sense of object position is not obtained.

For example, if the permissible error of the imaging position is represented as $\delta Do$, as illustrated in the drawing, the permissible shift amount $\delta Ws$ of the distance Ws between the L image object display position 311 and the R image object display position 312 on the display surface 310, i.e., the binocular disparity can be calculated from the permissible imaging position error $\delta Do$.

Figure 7:
FIG. 7 is a diagram for explaining a condition to be satisfied in three-dimensional (3D) image display.

This calculation process will be described with reference to FIG. 7. As illustrated in FIG. 7, the relationship between the permissible imaging position error $\delta Do$ and the permissible binocular disparity shift amount $\delta Ws$ can be represented by the following expression (Mathematical Expression 2).

$$\delta Ws = WeDs((1/Do)-(1/(Do-\delta Do))) \quad \text{(Mathematical Expression 2)}$$

Further, if $\delta Do$ is sufficiently small with respect to Do, the above expression (Mathematical Expression 2) can be represented by the following expression (Mathematical Expression 3).

$$\delta Ws = WeDs(\delta Do/Do^2) \quad \text{(Mathematical Expression 3)}$$

As described above, when the object in the image is not moving, even if the images photographed at different photographing times are used, the L image object display position 311 and the R image object display position 312 illustrated in FIG. 6 do not change. However, when the object in the image is moving, if the images photographed at different photographing times are used, the L image object display position 311 and the R image object display position 312 illustrated in FIG. 6 change.

When the image includes a moving object, therefore, the combination of the L and R images photographed at different photographing times as described with reference to FIGS. 5A and 5B, for example, impairs the correct depth effect of the 3D image.

When Vs represents the moving speed of the object in the image and $\delta T$ represents the difference in photographing time between the L and R images, the object moves in the image by a distance $Vs \cdot \delta T$ due to the time interval $\delta T$.

Therefore, when the permissible binocular disparity shift amount $\delta Ws$ of the above expression (Mathematical Expression 2 or 3) is set to be $Vs \cdot \delta T$, if there is an object having a maximum moving speed Vs in the image, the permissible difference in photographing time between the L and R images can be determined to be $\delta T$.

In the image processing apparatus 120 according to the embodiment of the present invention, the received information verification unit 211 of the output control unit 123 analyzes the L and R images and the attribute information to first determine whether or not the combination of L and R images photographed at the same photographing time has been acquired.

If the combination of L and R images photographed at the same photographing time has been acquired, the 3D image display based on the combination of L and R images photographed at the same photographing time is performed. Meanwhile, if the combination of L and R images photographed at the same photographing time has not been acquired, an object having the maximum moving speed Vs in the image is detected, and the permissible photographing time difference $\delta T$ between the L and R images is calculated. If it is possible to output the combination of L and R images having a difference in photographing time not exceeding the permissible photographing time difference $\delta T$, a 3D image is output with the use of the combination of L and R images having the difference in photographing time.

Meanwhile, if it is determined difficult to output the combination of L and R images having a difference in photographing time not exceeding the permissible photographing time difference $\delta T$, the process of switching from the 3D image display to the 2D image display is performed. In this case, the 2D image display is performed with the image selected in accordance with, for example, the priority information included in the attribute information previously described with reference to FIG. 2. Alternatively, a 2D image is output with the use of the undelayed one of the L and R images as the image for the right eye and the image for the left eye.

Figure 8:
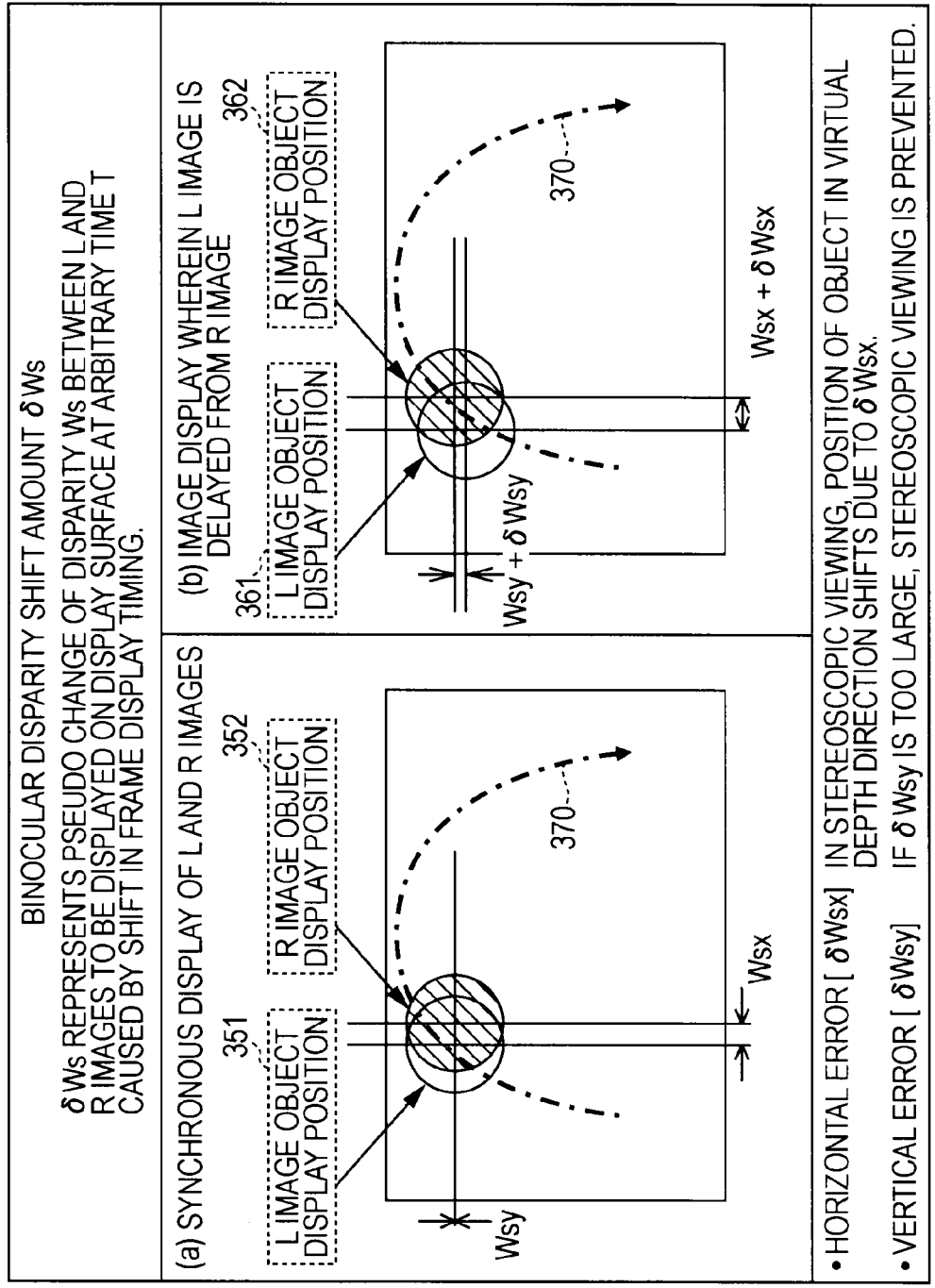
FIG. 8 is a diagram for explaining a display example of three-dimensional (3D) image display in which synchronous images photographed at the same photographing time are displayed, and a display example of three-dimensional (3D) image display which uses images photographed at different photographing times.

With reference to FIG. 8, a specific example of the moving object in the image will be described. FIG. 8 illustrates examples of images in (a) a 3D image display example using synchronous L and R images photographed at the same photographing time and (b) a 3D image display example using asynchronous L and R images photographed at different photographing times.

In the examples, a circular object is moving along an object trajectory 370 indicated by a curved line.

In the synchronous display example of (a) using the L and R images photographed at the same photographing time, an L image object display position 351 and an R image object display position 352 respectively correspond to the L image object display position 311 and the R image object display position 312 previously described with reference to FIG. 6. That is, the L image object display position 351 and the R image object display position 352 represent the respective object display positions of the L and R images photographed at the same photographing time. The observer observes the respective objects at these display positions with the left eye and the right eye, respectively. Accordingly, the observer can recognize the normal object position.

The distance between the L image object display position 351 and the R image object display position 352, i.e., the binocular disparity is represented as Wsx. The object position can be recognized at a position away by the object distance Do according to the foregoing expression (Mathematical Expression 1).

Meanwhile, the 3D image display example of (b) using the asynchronous L and R images photographed at different photographing times illustrates an L image object display position 361 and an R image object display position 362 in, for example, the combination of the R image photographed at the photographing time t03 and the L image photographed at the preceding photographing time t01.

In this case, the distance in the x-direction between the L image object display position 361 and the R image object display position 362 is represented as Wsx+δWsx, as illustrated in the drawing. That is, the binocular disparity Wsx occurring in the combination of the original synchronous L and R images is added with the error δWsx. This added value is a factor which shifts forward or backward the object imaging position for the observer, i.e., a factor which reduces or increases the distance Do between the eyes and the object previously described with reference to FIG. 6.

The image processing apparatus 120 according to the embodiment of the present invention presets the permissible imaging position error δDo, and determines whether or not the shift in the object imaging position in the 3D image display based on the combination of L and R images photographed at different photographing times does not exceed the permissible imaging position error δDo. If the shift in the object imaging position does not exceed the permissible imaging position error δDo, the 3D image display using the pair of L and R images, i.e., the pair of L and R images photographed at different photographing times is performed. If the shift in the object imaging position exceeds the permissible imaging position error δDo, the process of stopping the 3D image display and switching to the 2D image display is performed.

For example, it is now assumed that the 3D display is performed with the use of the L and R images photographed at the same photographing time up to the time t01, and thereafter one of the L and R images, e.g., the L image photographed at the photographing times t02 and t03, is used while the R image photographed at the photographing time t01 continues to be used. Further, it is assumed that the object illustrated in FIG. 8 is moving in the right direction along the object trajectory 370. In this case, only the object of the L image moves in the right direction, and the position of the object of the R image does not move. In this case, the observer feels as if the object illustrated in FIG. 8 is gradually approaching the observer. Thereafter, if the L and R images photographed at a time t05, for example, are acquired, and if the 3D image display based on the L and R images photographed at the photographing time t05 is performed, the observer feels as if the object having gradually approached the observer suddenly moves backward.

To prevent the observer from sensing such an unnatural movement of the object, the error in the object imaging position occurring in the 3D image display using the L and R images photographed at different photographing times should be controlled not to exceed the permissible object imaging position error δDo described with reference to FIG. 6.

If the moving direction component of the object includes a y-direction component, the respective display positions of the L image object display position 361 and the R image object display position 362 are also shifted in the y-direction. That is, as illustrated in (b) of FIG. 8, the distance in the y-direction between the L image object display position 361 and the R image object display position 362 is represented as Wsy+δWsy, as illustrated in the drawing.

The shift in the y-direction causes the issue of double blurring of an object. Therefore, a process is performed which presets the permissible shift amount δWsy also in the y-direction and performs the 3D image display process if the shift in the y-direction of the object display positions in the L and R images to be used does not exceed the permissible shift amount δWsy.

Specifically, for example, a configuration is provided which sets or calculates the two permissible values δWsx and δWsy and performs a 3D/2D image switching determination process by using the smaller one of the two permissible values. This specific process example will be described later with reference to flowcharts. The shift in the y-direction causes the issue of double blurring of an object. Therefore, the configuration may be modified to stop the 3D display and switch to the 2D display if a shift in the y-direction of the object display position is detected.

[3. Details of Processing Performed by Image Processing Apparatus according to Embodiment of Present Invention]

Subsequently, details of the processing performed by the image processing apparatus 120 according to the embodiment of the present invention will be described with reference to FIG. 9 and the subsequent drawings.

As described above, in the image processing apparatus 120 according to the embodiment of the present invention, the received information verification unit 211 of the output control unit 123 analyzes the L and R images and the attribute information to first determine whether or not the combination of L and R images photographed at the same photographing time can be obtained. If the combination of L and R images photographed at the same photographing time can be obtained, the 3D image display based on the combination of L and R images photographed at the same photographing time is performed.

Meanwhile, if it is difficult to obtain the combination of L and R images photographed at the same photographing time, an object having the maximum moving speed Vs in the image is detected, and the permissible photographing time difference δT between the L and R images is calculated. If it is possible to output the combination of L and R images having a difference in photographing time not exceeding the permissible photographing time difference δT, a 3D image is output with the use of the combination of L and R images having the difference in photographing time.

Meanwhile, if it is determined difficult to output the combination of L and R images having a difference in photographing time not exceeding the permissible photographing time difference δT, the process of switching from the 3D image display to the 2D image display is performed. In this case, the 2D image display is performed with the image selected in accordance with, for example, the priority information included in the attribute information previously described with reference to FIG. 2. Alternatively, a 2D image is output with the use of the undelayed one of the L and R images as the image for the right eye and the image for the left eye.

The parameters acquired or calculated by the received information verification unit 211 will be described with reference to FIG. 9. The parameters acquired or calculated by the received information verification unit 211 are as follows: (1) the distance Do between the eyes and the object (the imaging position), (2) the permissible imaging position error δDo, (3) the distance Ds between the eyes and the display surface, (4) the distance We between the eyes, (5) the binocular disparity (the difference between the object display positions of the L and R images on the display surface) Ws, (6) the inter-frame motion vector (the maximum value) V, (7) the permissible binocular disparity shift amount δWs, and (8) the permissible L and R image display timing difference amount (the permissible photographing time difference) δT.

Example of the processes of calculating or acquiring the above parameters (1) to (8) will be described. The value of (1) the distance Do between the eyes and the object (the imaging position) is calculated with the use of the binocular disparity Ws, the distance Ds between the eyes and the display surface, and the distance We between the eyes in accordance with the previously described expression (Mathematical Expression 1). The respective values of (2) the permissible imaging position error δDo, (3) the distance Ds between the eyes and the display surface, and (4) the distance We between the eyes are preset and stored in the memory 213.

The value of (5) the binocular disparity (the difference between the object display positions of the L and R images on the display surface) Ws is calculated on the basis of the distance Ds between the eyes and the display surface and the analysis of the received image. The value of (6) the interframe motion vector (the maximum value) V is calculated on the basis of the analysis of the received image. The interframe motion vector (the maximum value) V includes the information of the moving speed Vs and the moving direction of the object moving at the maximum speed between frames.

The value of (7) the permissible binocular disparity shift amount δWs is calculated with the use of the distance Ds between the eyes and the display surface, the distance Do between the eyes and the object (the imaging position), the permissible imaging position error δDo, and the distance We between the eyes by the application of the previously described expression (Mathematical Expression 2 or 3). Alternatively, the configuration may be modified to store a preset fixed value of the permissible binocular disparity shift amount δWs in the memory 213 and use the thus stored value.

The value of (8) the permissible L and R image display timing difference amount (the permissible photographing time difference) δT is calculated with the use of the above-described permissible binocular disparity shift amount δWs and the inter-frame motion vector (the maximum value) V calculated by image analysis. That is, the value is calculated in accordance with the expression δT=δWs/Vs, wherein Vs represents the magnitude of the inter-frame motion vector (the maximum value) V, i.e., the moving speed of the object.

Figure 11:
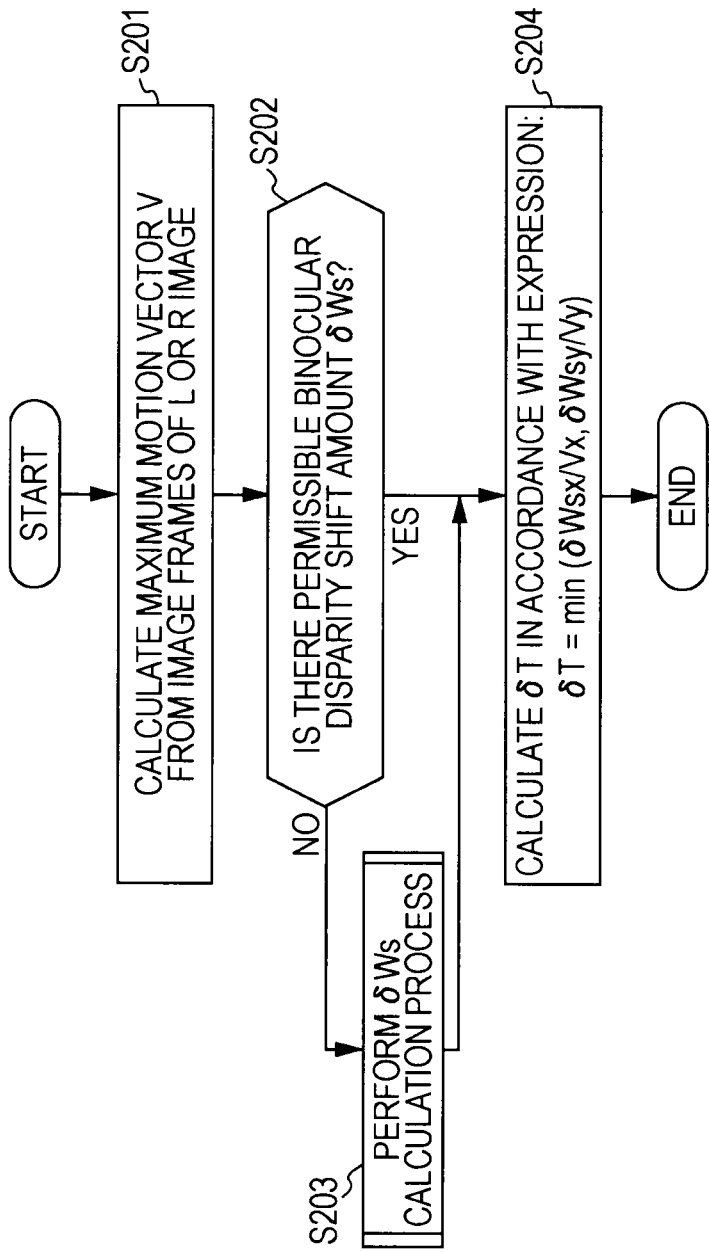
FIG. 11 is a diagram illustrating a flowchart for explaining a δT calculation process included in the process sequence for determining which one of 3D image display and 2D image display should be performed in the image processing apparatus according to an embodiment of the present invention.
Figure 12:
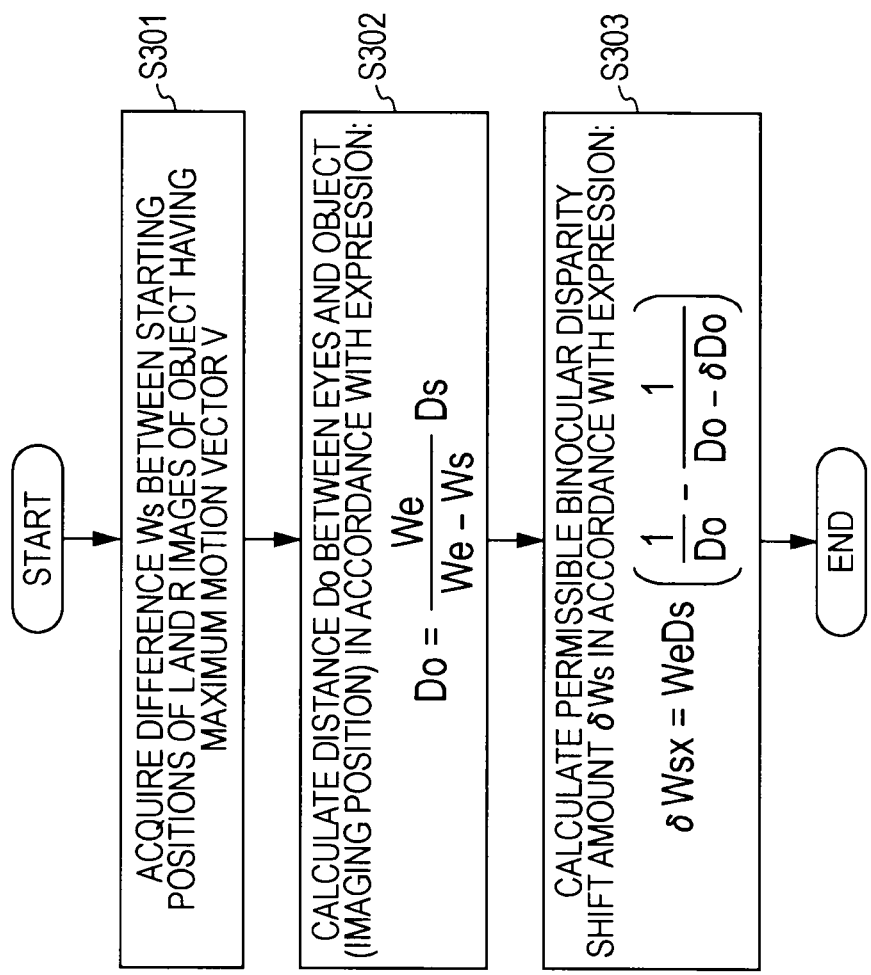
FIG. 12 is a diagram illustrating a flowchart for explaining a δWs calculation process included in the process sequence for determining which one of 3D image display and 2D image display should be performed in the image processing apparatus according to an embodiment of the present invention.

The display image determination sequence performed by the output control unit 123 will be described below with reference to the flowcharts illustrated in FIGS. 10 to 12. FIG. 10 is a flowchart for explaining the entirety of the display image determination sequence performed by the output control unit 123. FIG. 11 is a flowchart for explaining details of the process of Step S103 illustrated in FIG. 10, i.e., a sequence of calculating the permissible L and R image display timing difference amount δT. FIG. 12 is a flowchart for explaining details of the process of Step S203 illustrated in FIG. 11, i.e., a sequence of calculating the permissible binocular disparity shift amount δWs.

With reference to the flowchart illustrated in FIG. 10, description will be first made of the entirety of the display image determination sequence performed by the output control unit 123. At Step S101, the received information verification unit 211 of the output control unit 123 determines whether or not synchronous image display of the L and R images can be performed. That is, the received information verification unit 211 determines whether or not the L and R images photographed at the same photographing time can be acquired and displayed without packet loss or delay. If it is determined that the synchronous image display of the L and R images can be performed, the sequence proceeds to Step S106 to perform the 3D image display process according to the active stereo system or the passive stereo system previously described with reference to FIGS. 4A and 4B, with the use of the L and R images photographed at the same photographing time.

If the determination at Step S101 is NO, i.e., if it is determined that the reception of the L or R image is delayed and thus the synchronous display of the L and R images is difficult, the sequence proceeds to Step S102.

At Step S102, it is determined whether or not the permissible L and R image display timing difference amount (the permissible photographing time difference) δT can be acquired from the attribute information of the acquired L and R images. The permissible L and R image display timing difference amount (the permissible photographing time difference) δT corresponds to the permissible transmission delay time amount included in the attribute information of the packets described with reference to FIG. 2.

If the permissible transmission delay time amount is acquired from the attribute information of the received packets, the value of the permissible transmission delay time amount is set as the permissible L and R image display timing difference amount (the permissible photographing time difference) δT.

Meanwhile, if the permissible transmission delay time amount is not acquired from the attribute information of the received packets, the sequence proceeds to Step S103 to perform the δT calculation process.

After the process of acquiring or calculating δT, the sequence proceeds to Step S104. At Step S104, the time difference in photographing time between the L and R images to be used is compared with the acquired or calculated permissible photographing time difference δT.

The time difference in photographing time between the L and R images to be used is calculated as the difference between the photographing times included in the attribute information of the packets described with reference to FIG. 2.

If it is determined at Step S104 that the time difference in photographing time between the L and R images to be used does not exceed the permissible photographing time difference δT, the determination at Step S104 is YES. In this case, it is determined that a sense of substantial unnaturalness will not be caused by the three-dimensional (3D) image display based on the combination of these L and R images. Then, the sequence proceeds to Step S106 to perform the 3D image display process according to the active stereo system or the passive stereo system previously described with reference to FIGS. 5A and 5B, with the use of the L and R images having the difference in photographing time not exceeding the permissible photographing time difference δT.

Meanwhile, if it is determined at Step S104 that the time difference in photographing time between the L and R images to be used exceeds the permissible photographing time difference δT, the determination at Step S104 is NO. In this case, it is determined that a sense of substantial unnaturalness will be caused if the three-dimensional (3D) image display based on the combination of these L and R images is performed. Then, the sequence proceeds to Step S105 to stop the 3D image and switch to the 2D image display. Specifically, the 2D image display is performed with the image selected in accordance with, for example, the priority information included in the attribute information previously described with reference to FIG. 2. Alternatively, a 2D image is output with the use of the undelayed one of the L and R images as the image for the right eye and the image for the left eye.

Details of the process of Step S103 in the flowchart of FIG. 10, i.e., the sequence of calculating the permissible L and R image display timing difference amount (the permissible photographing time difference) δT will be described with reference to FIG. 11.

At Step S201, the maximum motion vector V is calculated from the image frames of the L or R image. This process uses successive frames of one of the L and R images.

The state of inter-frame movement of the object moving at the maximum speed is analyzed on the basis of the successive frames, and the maximum motion vector V is calculated. The vector V includes the information of the moving speed Vs and the moving direction of the object. The moving speed can be calculated from the moving distance and the time interval between the frames. The vector V is a two-dimensional vector represented as (Vx, Vy), wherein Vx and Vy represent the object moving speed in the x-direction and the object moving speed in the y-direction, respectively.

Then, it is determined at Step S202 whether or not the permissible binocular disparity shift amount δWs can be acquired. The permissible binocular disparity shift amount δWs may be stored in the memory 213 as a preset value. In this case, the permissible binocular disparity shift amount δWs is acquired from the memory 213, and the sequence proceeds to Step S204.

Meanwhile, if the permissible binocular disparity shift amount δWs is not set as the value stored in the memory 213, the sequence proceeds to Step S203 to calculate the permissible binocular disparity shift amount δWs. Thereafter, the sequence proceeds to Step S204. The process of calculating the permissible binocular disparity shift amount δWs at Step S203 will be described later.

At Step δ204, the permissible L and R image display timing difference amount (the permissible photographing time difference) δT is calculated in accordance with the following expression (Mathematical Expression 4).

$$\delta T = \min(\delta Wsx/Vx, \delta Wsy/Vy) \quad \text{(Mathematical Expression 4)}$$

In the above expression, δWsx represents the x-direction component of the permissible binocular disparity shift amount δWs, and δWsy represents the y-direction component of the permissible binocular disparity shift amount δWs. Further, min(a, b) indicates that a small value is selected for each of a and b.

As previously described with reference to FIG. 8, δWs and δWsy, which are respectively the x-direction component and the y-direction component of the permissible binocular disparity shift amount δWs, are values respectively representing the shift in the x-direction and the shift in the y-direction from the object display positions in the synchronous L and R images.

At least the y-direction component δWsy of the permissible binocular disparity shift amount δWs is stored in the memory 213 as a previously determined preset value. The x-direction component δWsx of the permissible binocular disparity shift amount δWs may be stored in the memory 213 or calculated at Step S203.

Subsequently, with reference to the flowchart illustrated in FIG. 12, description will be made of details of the process of calculating the permissible binocular disparity shift amount δWs at Step S203.

At Step S301, Ws is first acquired which represents the difference between the respective starting positions of the L and R images of the object having the maximum motion vector V calculated at Step S201 in the foregoing flow of FIG. 11. The L and R images used here are a pair of L and R images photographed at different photographing times and to be applied to the 3D image display, i.e., the L and R images photographed at different photographing times previously described with reference to (b) of FIG. 8.

At Step S302, the distance Do between the eyes and the object is calculated in accordance with the previously described expression (Mathematical Expression 1). That is, the distance Do between the eyes and the object is calculated in accordance with the following expression.

$$Do = (We/(We - Ws))Ds \quad \text{(Mathematical Expression 1)}$$

Herein, We represents the distance between the left and right eyes of the observer, Ws represents the distance between the respective display positions of the same object in the L and R images on the display surface, and Ds represents the distance between the eyes and the display surface. The values of We and Ds stored in the memory 213 are used.

Then, at Step S303, the permissible binocular disparity shift amount δWsx in the x-direction is calculated. The process of calculating the permissible binocular disparity shift amount δWsx in the x-direction is performed by the application of the previously described expression (Mathematical Expression 2). That is, the permissible binocular disparity shift amount δWsx in the x-direction is calculated by the application of the following expression.

$$\delta Ws = WeDs((1/Do) - (1/(Do - \delta Do))) \quad \text{(Mathematical Expression 2)}$$

Herein, We represents the distance between the left and right eyes of the observer, Ds represents the distance between the eyes and the display surface, Do represents the distance between the eyes and the object, and δDo represents the permissible imaging position error. The values of We, Ds, and δDo are preset, and the values thereof stored in the memory 213 are used. Further, the value calculated at Step S302 is used as Do.

The configuration may be modified to calculate the permissible binocular disparity shift amount δWsx in the x-direction by the application of another expression (Mathematical Expression 3) in place of the above expression (Mathematical Expression 2). That is, the permissible binocular disparity shift amount δWsx in the x-direction may be calculated by the application of the following expression.

$$\delta Ws = WeDs(\delta Do/Do^2) \quad \text{(Mathematical Expression 3)}$$

The permissible binocular disparity shift amount δWsx in the x-direction is calculated in the above-described manner. Then, at Step S204 illustrated in FIG. 11, the smaller one of δWsx/Vx and δWsy/Vy is set to be the permissible L and R image display timing difference amount (the permissible photographing time difference) δT.

At Step S104 of FIG. 10, δT calculated by the above process, i.e., the permissible L and R image display timing difference amount (the permissible photographing time difference) δT is compared with the photographing time difference ΔT between the L and R images to be displayed. That is, whether or not the following expression (Mathematical Expression 5) holds is determined.

Photographing time difference ΔT between the L and R images to be displayed ≦ Permissible photographing time difference δT    (Mathematical Expression 5)

If the above expression (Mathematical Expression 5) holds, it is determined that a sense of unnaturalness will not be caused to the observer, and the 3D display is performed with the use of the L and R images to be displayed (Step S106). If the above expression (Mathematical Expression 5) does not hold, it is determined that a sense of unnaturalness will be caused to the observer, and the 3D display using the L and R images to be displayed is stopped, and the 2D image display is performed with the use of one of the L and R images as the image observable by both eyes (Step S105).

As described above, the image processing apparatus 120 according to the embodiment of the present invention is configured such that, if it is difficult to acquire the L and R images in synchronization with each other in photographing time, whether or not the shift in the object imaging position or the shift in the binocular disparity occurring in the 3D image display using L and R images photographed at different photographing times does not exceed the preset permissible value is determined on the basis of the moving state of an object included in the image, and that the 3D image display is performed if the shift does not exceed the permissible value. Therefore, natural 3D image display can be performed even if it is difficult to acquire the L and R images in synchronization with each other in photographing time.

That is, in the processing according to an embodiment of the invention of the present application, the 3D image display is performed if it is possible to obtain the combination of L and R images, wherein the shift in the object imaging position and the shift in the binocular disparity, which occur in the 3D image display using L and R images photographed at different photographing times, do not exceed the permissible imaging position error $\delta Do$ and the permissible binocular disparity shift amount $\delta Ws$, respectively.

The permissible binocular disparity shift amount $\delta Ws$ and the permissible L and R image display timing difference amount (the permissible photographing time difference) $\delta T$ have the relationship represented by the expression $\delta Ws = Vs \cdot \delta T$, wherein $Vs$ represents the moving speed of a moving object moving at the maximum speed.

Therefore, if the permissible L and R image display timing difference amount (the permissible photographing time difference) $\delta T$ has previously been provided, whether to perform the 3D image display or to switch to the 2D image display can be determined solely by the comparison of $\delta T$ with the difference in photographing time between the L and R images to be used.

Even if the permissible L and R image display timing difference amount (the permissible photographing time difference) $\delta T$ has not previously been provided, $\delta T$ can be calculated by the process of Step S103 illustrated in FIG. 10, i.e., the process described with reference to FIGS. 11 and 12. That is, $\delta T$ is calculated in accordance with the expression $\delta T = \delta Ws/Vs$ with the use of the permissible binocular disparity shift amount $\delta Ws$ and the inter-frame motion vector (the maximum value) V calculated by image analysis. Herein, Vs represents the magnitude of the inter-frame motion vector (the maximum value) V, i.e., the moving speed of the object. In the flowcharts, description has been made of the configuration which individually performs the calculation and determination for the x-component and the y-component. However, the configuration may be modified to calculate $\delta T$ in accordance with the above expression, without separation into the x-component and the y-component, and to perform the determination on the basis of the calculated value of $\delta T$.

Therefore, even when $\delta T$ has not been set as a preset value, if the permissible imaging position error $\delta Do$ has been set, it is possible to determine whether or not the image display with an error of the object imaging position not exceeding the permissible imaging position error $\delta Do$ can be performed. Accordingly, if the 3D image display using L and R images photographed at different photographing times is performed on the basis of the determination result, the error of the object imaging position due to the display process is guaranteed not to exceed the permissible imaging position error $\delta Do$, and a natural 3D image can be observed.

Description has been made of the configuration which acquires from the memory 213 some of the values used in the respective calculations illustrated in the flowcharts described with reference to FIGS. 10 to 12, and which acquires others of the values from the attribute information included in the packets received from the cameras L101 and R102. The configuration may be modified to store all of these values in the packets transmitted from the cameras L101 and R102, or to acquire the values from an external server.

Further, the series of processes described in the specification can be performed by hardware, software, or a combined configuration of the two. To have the processes performed by software, a program recording the process sequence can be installed and executed in a memory of a computer incorporated in special hardware, or the program can be installed and executed in a general-purpose computer capable of performing a variety of processes. For example, the program can previously be recorded in a recording medium. The program can be installed in a computer from the recording medium, and also can be received through a network such as a LAN (Local Area Network) and the Internet and installed in a recording medium such as an internal hard disk.

The variety of processes described in the specification may be performed not only chronologically in accordance with the description but also concurrently or individually as appropriate or in accordance with the processing capability of the apparatus which performs the processes. Further, in the present specification, a system refers to a logical collective configuration of a plurality of apparatuses, and is not limited to apparatuses of respective configurations stored in the same housing.

The present application contains subject matter related to that disclosed in Japanese Priority Patent Application JP 2009-145987 filed in the Japan Patent Office on Jun. 19, 2009, the entire content of which is hereby incorporated by reference.

The present invention has been described in detail with reference to particular embodiments. However, it is obvious that a person skilled in the art could modify or alter the embodiments within the scope not departing from the gist of the present invention. That is, the present invention has been disclosed as examples thereof, and thus should not be restrictively interpreted. For understanding of the gist of the present invention, the claims should be referred to.

What is claimed is:

1. An image processing apparatus comprising:
    a receiving unit configured to receive communication data including an L image as an image for the left eye and an R image as an image for the right eye, which are applied to three-dimensional image display;
    an attribute information acquisition unit configured to acquire, from the communication data, attribute information including a photographing time; and
    an output control unit configured to analyze the images and the attribute information included in the communication data, and perform a process of switching between three-dimensional image display and two-dimensional image display on the basis of the result of the analysis,
    wherein, if a pair of L and R images photographed at the same photographing time has been acquired, the output control unit performs the three-dimensional image display,
    wherein, if a pair of L and R images photographed at the same photographing time has not been acquired, the output control unit determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error, and wherein the output control unit calculates an inter-frame motion vector V of a moving object having a maximum moving speed among moving objects included in the L and R images photographed at different photographing times, calculates a permissible photographing time difference $\delta T$ by using the motion vector V and a permissible binocular disparity shift amount $\delta Ws$ on a display surface of a three-dimensional image, performs the three-dimensional image display using the L and R images photographed at different photographing times if the difference in photographing time between the L and R images photographed at different photographing times does not exceed the permissible photographing time difference $\delta T$, and stops the three-dimensional image display and performs the two-dimensional image display if the difference in photographing time between the L and R images photographed at different photographing times exceeds the permissible photographing time difference $\delta T$.

2. The image processing apparatus according to claim 1, wherein the output control unit acquires a moving speed Vs of the object from the motion vector V, and performs a process of calculating the permissible photographing time difference $\delta T$ in accordance with an expression $\delta T = \delta Ws/Vs$.

3. The image processing apparatus according to claim 1, wherein the output control unit acquires a permissible binocular disparity shift amount $\delta Wsx$ in the x-direction and a permissible binocular disparity shift amount $\delta Wsy$ in the y-direction of the permissible binocular disparity shift amount $\delta Ws$ on the display surface of the three-dimensional image, acquires a moving speed Vsx in the x-direction and a moving speed Vsy in the y-direction predetermined by the inter-frame motion vector V, and performs a process of calculating the permissible photographing time difference $\delta T$ as the smaller one of values $\delta Wsx/Vsx$ and $\delta Wsy/Vsy$.

4. An image processing apparatus comprising:
a receiving unit configured to receive communication data including an L image as an image for the left eye and an R image as an image for the right eye, which are applied to three-dimensional image display;
an attribute information acquisition unit configured to acquire, from the communication data, attribute information including a photographing time; and
an output control unit configured to analyze the images and the attribute information included in the communication data, and perform a process of switching between three-dimensional image display and two-dimensional image display on the basis of the result of the analysis,
wherein, if a pair of L and R images photographed at the same photographing time has been acquired, the output control unit performs the three-dimensional image display,
wherein, if a pair of L and R images photographed at the same photographing time has not been acquired, the output control unit determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error, and wherein the output control unit acquires a preset permissible photographing time difference $\delta T$, performs the three-dimensional image display using the L and R images photographed at different photographing times if the difference in photographing time between the L and R images photographed at different photographing times does not exceed the permissible photographing time difference $\delta T$, and stops the three-dimensional image display and performs the two-dimensional image display if the difference in photographing time between the L and R images photographed at different photographing times exceeds the permissible photographing time difference $\delta T$.

5. An image processing apparatus comprising:
a receiving unit configured to receive communication data including an L image as an image for the left eye and an R image as an image for the right eye, which are applied to three-dimensional image display;
an attribute information acquisition unit configured to acquire, from the communication data, attribute information including a photographing time; and
an output control unit configured to analyze the images and the attribute information included in the communication data, and perform a process of switching between three-dimensional image display and two-dimensional image display on the basis of the result of the analysis,
wherein, if a pair of L and R images photographed at the same photographing time has been acquired, the output control unit performs the three-dimensional image display,
wherein, if a pair of L and R images photographed at the same photographing time has not been acquired, the output control unit determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error, and wherein, to stop the three-dimensional image display and perform the two-dimensional image display, the output control unit performs the two-dimensional image display by referring to priority information included in the attribute information stored in the communication data and selecting an image having a high priority.

6. An image processing method performed by an image processing apparatus, the image processing method comprising the steps of:
causing a communication unit to receive communication data including an L image as an image for the left eye and an R image as an image for the right eye, which are applied to three-dimensional image display;

causing an attribute information acquisition unit to acquire, from the communication data, attribute information including a photographing time; and causing an output control unit to analyze the images and the attribute information included in the communication data, and perform a process of switching between three-dimensional image display and two-dimensional image display on the basis of the result of the analysis, wherein, if a pair of L and R images photographed at the same photographing time has been acquired, the analyzing and switching step performs the three-dimensional image display, wherein, if a pair of L and R images photographed at the same photographing time has not been acquired, the analyzing and switching step determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error, and wherein, to stop the three-dimensional image display and perform the two-dimensional image display, the output control unit performs the two-dimensional image display by referring to priority information included in the attribute information stored in the communication data and selecting an image having a high priority.

7. A non-transitory computer readable storage medium having instructions stored therein, which when executed by a processor in an image processing apparatus causes the processor to execute a method comprising the steps of:

causing a communication unit to receive communication data including an L image as an image for the left eye and an R image as an image for the right eye, which are applied to three-dimensional image display;

causing an attribute information acquisition unit to acquire, from the communication data, attribute information including a photographing time; and causing an output control unit to analyze the images and the attribute information included in the communication data, and perform a process of switching between three-dimensional image display and two-dimensional image display on the basis of the result of the analysis, wherein, if a pair of L and R images photographed at the same photographing time has been acquired, the analyzing and switching step performs the three-dimensional image display, wherein, if a pair of L and R images photographed at the same photographing time has not been acquired, the analyzing and switching step determines whether or not an object imaging position error occurring in the three-dimensional image display using L and R images photographed at different photographing times does not exceed a preset permissible object imaging position error, performs the three-dimensional image display using the L and R images photographed at different photographing times if the object imaging position error does not exceed the permissible error, and stops the three-dimensional image display and performs the two-dimensional image display if the object imaging position error exceeds the permissible error, and wherein, to stop the three-dimensional image display and perform the two-dimensional image display, the output control unit performs the two-dimensional image display by referring to priority information included in the attribute information stored in the communication data and selecting an image having a high priority.

* * * * *